(12) United States Patent
Choy et al.

(10) Patent No.: US 12,147,308 B2
(45) Date of Patent: Nov. 19, 2024

(54) PROFILE-GUIDED ADAPTIVE DATA EXTRACTION JOB SCHEDULER FOR DATA BACKUP SERVICE

(71) Applicant: Own Data Company Ltd, Tel Aviv (IL)

(72) Inventors: Jason K. S. Choy, Short Hills, NJ (US); Surya Kiran Laskar, Norwood, NJ (US); Harel Oz Yadgar, Jerusalem (IL); Yehonatan Mazar, Tel Aviv (IL)

(73) Assignee: Own Data Company Ltd, Tel Aviv (IL)

( * ) Notice: Subject to any disclaimer, the term of this patent is extended or adjusted under 35 U.S.C. 154(b) by 9 days.

(21) Appl. No.: 18/089,819

(22) Filed: Dec. 28, 2022

(65) Prior Publication Data

US 2024/0220373 A1 Jul. 4, 2024

(51) Int. Cl.
*G06F 11/14* (2006.01)

(52) U.S. Cl.
CPC ...... *G06F 11/1461* (2013.01); *G06F 11/1464* (2013.01); *G06F 11/1466* (2013.01)

(58) Field of Classification Search
CPC ............. G06F 11/1461; G06F 11/1464; G06F 11/1466
USPC ......................................................... 714/6.3
See application file for complete search history.

(56) References Cited

U.S. PATENT DOCUMENTS

| | | | |
|---|---|---|---|
| 9,633,051 B1 | 4/2017 | Maccanti et al. | |
| 10,983,873 B1 | 4/2021 | Blackard | |
| 2017/0286234 A1 | 10/2017 | Shulga et al. | |
| 2021/0109822 A1* | 4/2021 | Al-Alem | G06F 16/215 |
| 2021/0390495 A1* | 12/2021 | Upadhyay | G06F 9/5016 |
| 2023/0244522 A1* | 8/2023 | Chandrasekaran | G06F 3/061 |
| | | | 718/103 |

FOREIGN PATENT DOCUMENTS

IN 311641 B 4/2019

* cited by examiner

*Primary Examiner* — Yair Leibovich
(74) *Attorney, Agent, or Firm* — Fish & Richardson P.C.

(57) ABSTRACT

Methods, systems, and apparatus, including computer programs encoded on computer storage media, for scheduling jobs for a data backup service using backup process history and backup target entity profiles.

20 Claims, 2 Drawing Sheets

PROFILE-GUIDED ADAPTIVE DATA EXTRACTION JOB SCHEDULER FOR DATA BACKUP SERVICE

BACKGROUND

This specification relates to scheduling jobs to back up a large database, e.g., a large cloud-based data store.

Cloud-based applications generally use some kind of database in the cloud to store data. Typically those data are stored in entities which correspond to different database tables, e.g., accounts, contacts, or opportunities, and vary in size, from megabytes to gigabytes to terabytes. The sizes of the entities are generally dynamic in nature and change all the time.

A data backup service for such cloud-based information systems will generally be responsible for a full extraction, i.e., backup, of the database on a regular basis, e.g., daily or weekly. Data backup services for cloud-based information systems extract data over the Internet The typical way of extracting data from cloud-based information systems is through APIs (application program interfaces), e.g., REST or SOAP interfaces over the Internet. An information system generally imposes many constraints that affect the performance of the APIs at the time of the extraction, e.g., their latency, which may be related to physical distance and network topology, and their throughput, which may be related to hardware performance, software throttling, or resource contention from other applications running at the same time. Information system constraints are dynamic in nature and can change from time to time.

One performance goal, and often the most important performance goal, for a backup service when extracting data from a cloud-based information system is to minimize the total elapsed time for the extraction. However, actual performance is highly dependent on the behavior of the APIs and the amount of data used by the service during the data extraction.

One common approach for backup services to speed up the extraction is to leverage multiple extraction streams to work in parallel, e.g., three different data extraction workers extracting data in parallel from different entities. One of the basic optimization approaches is to schedule longer jobs upfront to avoid idling workers.

SUMMARY

This specification describes technologies for determining an optimal fetching solution for extracting data to effect a backup of a database, by determining which entities will take the longest time to extract, in an environment in which the system being backed up is dynamic with many variables in play; for example, the data volume can change, the data volume does not necessarily correspond to the download time, e.g., bigger tables sometimes have simpler and smaller record sizes, the system performance can change, the contention of resource at the time of a job can be different from day to day, and the latency of the Internet at the time of extraction can be different from day to day.

This specification describes technologies that combine data volume heuristics obtained from system-provided metrics and historical performance profiles to estimate the expected longest-running job for the current extraction, then use this information to identify a job to send to a worker for execution. This provides a simple, compute efficient and memory efficient process that is adaptive over time corresponding to system behavior changes to feed a greedy scheduling algorithm.

The subject matter described in this specification as implemented in particular embodiments realizes one or more of the following technical advantages. Scheduled backup jobs generally complete a requested backup in a minimal elapsed, i.e., wall-clock, time. Workers performing scheduled backup jobs have a minimal idle time while the backup is in progress. By adjusting a single parameter, a user, e.g., a system administrator, can change the balance of importance between historical backup metrics and recent backup performance data. The user can make this adjustment based on the user's knowledge of the difference between long-term and short-term behavior of the information system. The systems and methods described in this specification can reduce an amount of time necessary to backup multiple objects for an entity, e.g., using a combination of respective data object sizes and historical backup time data for data objects. The backup system and process is adaptive to an ever changing and dynamic performance of cloud-based SaaS systems when backing up such systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
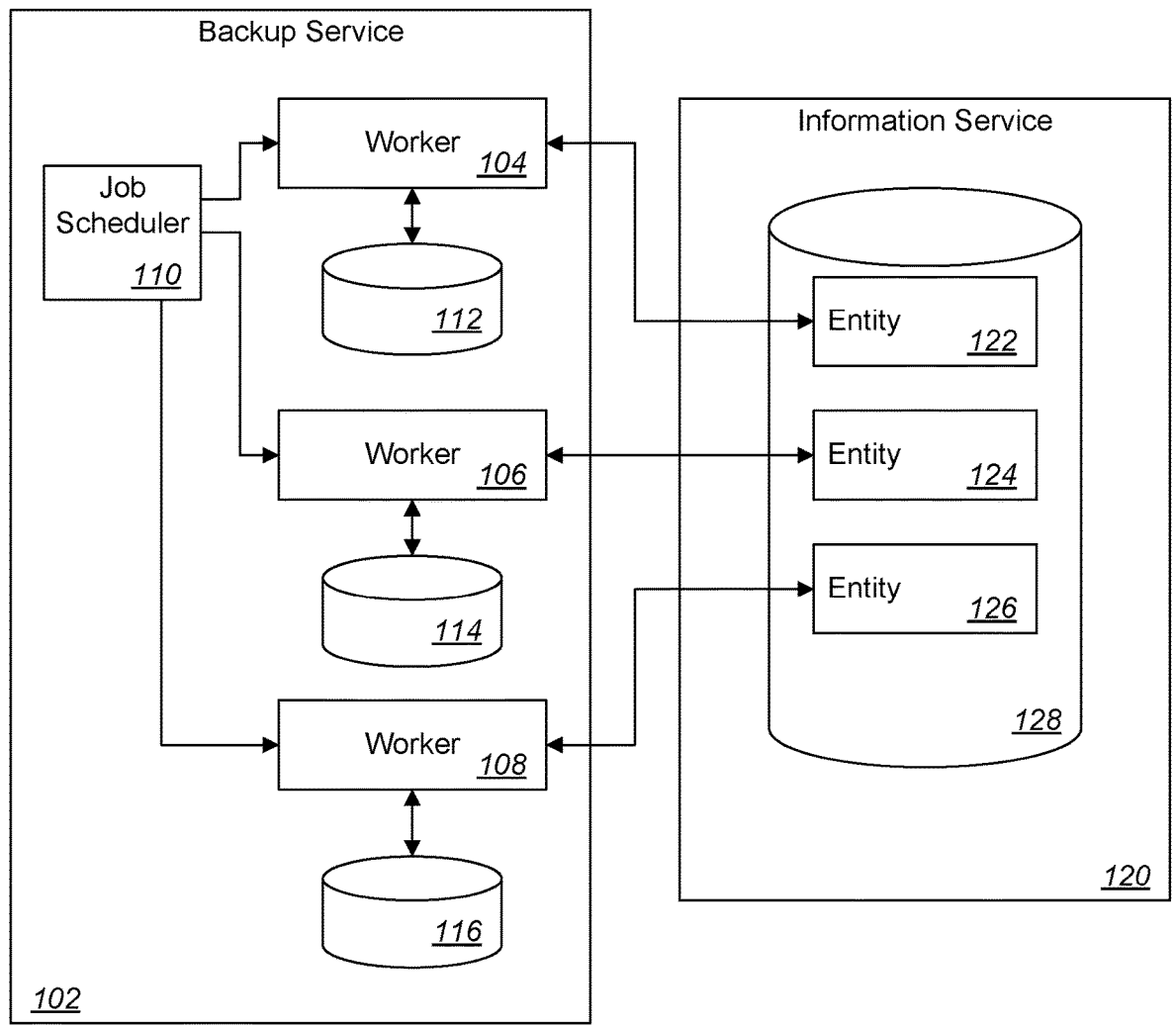
FIG. 1 illustrates a backup service with workers and a job scheduler.

FIG. 1 illustrates a backup service 102 with workers 104, 106, 108 and a job scheduler 110 for scheduling data extraction jobs on the workers. The workers extract, in order to back them up, entities 122, 124, 126 stored, in a database 128 or otherwise, on or for an information system 120. The number of workers will be two or more, and advantageously, the number is three or more. The number of entities to be backed up will generally be larger than the number of workers.

The extracted data is stored, in original or modified form, in backup stores 112, 114, 116. The backup stores used by the workers can be a single storage repository for all the workers or multiple repositories. In some cases, the information service is a cloud-based service and the entities are stored in cloud-based storage implemented on computers and storage devices in one or more locations. Similarly, the backup service, job scheduler, and workers are implemented on computers and storage devices in one or more locations. The workers extract entities using APIs implemented by the information service or, alternatively, by the infrastructure storing the entities.

Figure 2:
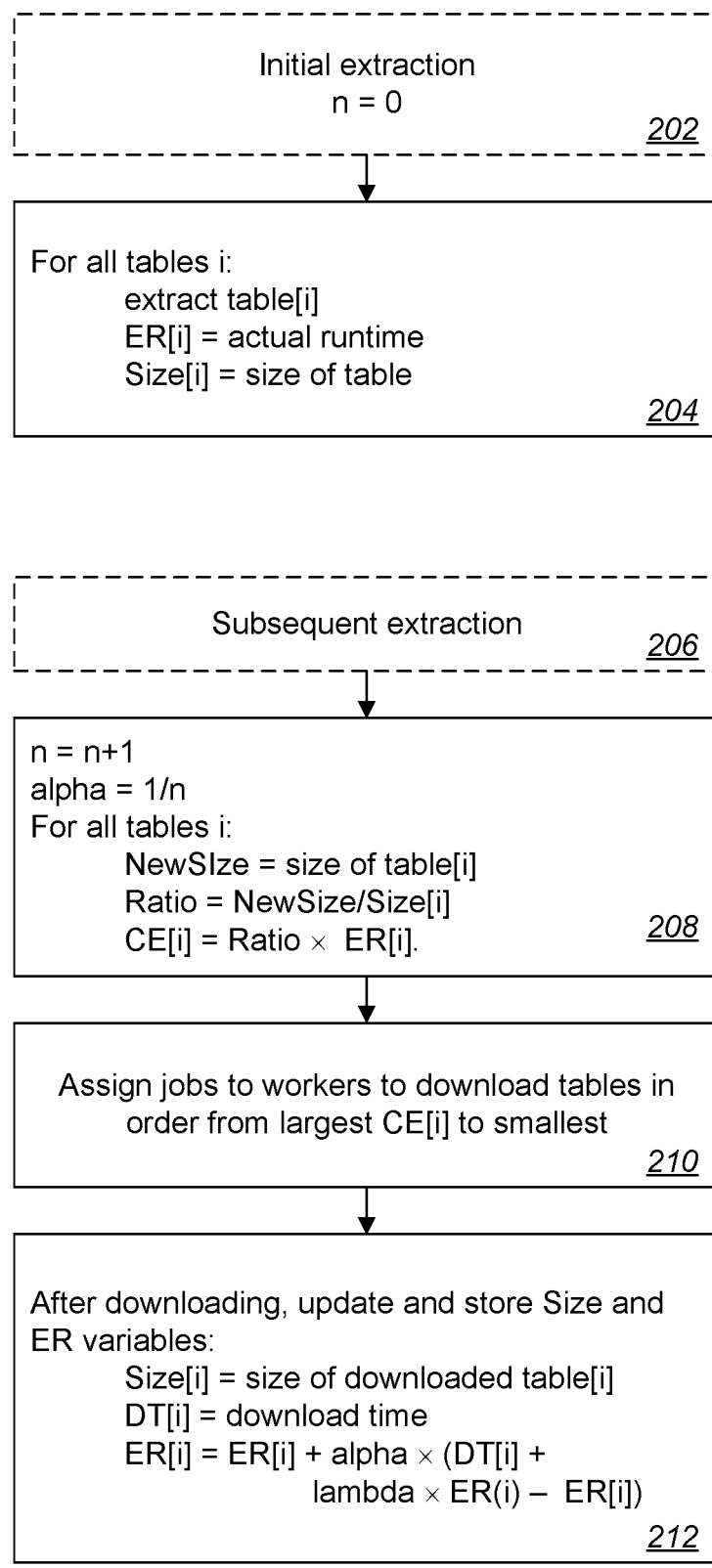
FIG. 2 is a flowchart of a method for assigning backup jobs to workers of a backup service.

FIG. 2 is a flowchart of a method for assigning backup jobs to workers of a backup service. The method can be performed, for example, by a job scheduler of a backup service with respect to an information service of the kind described in reference to FIG. 1.

Each worker extracts one entity at a time as specified by the job assigned to the worker. For exposition, each entity will be described as a table of a database, although the entities may be data objects other than tables. In alternative implementations, one job may be assigned in some cases to extract more than one entity at a time. Also, in some implementations, the extracted entities may be extracted from more than one database. In this specification, the term "database" refers broadly to any collection of data: the data does not need to be structured in any particular way, or structured at all, and it can be stored on storage devices in one or more locations.

The backup service may receive data identifying a set of entities to be extracted, which may be fewer than all the entities in the database or databases of the information system.

The jobs and workers are identical except for the entities that are assigned to them for extraction.

The data to be extracted, i.e., downloaded by workers, is a collection of tables, each of which will be identified respectively, in this specification, with an index i=1, . . . , T. T is the total number of tables.

A user, e.g., a user representing the information system, can optionally set a system dynamics parameter lambda, in a range of zero to one inclusive, to control a tradeoff between immediate and long-term preference. By setting this parameter the user indicates to the backup service how the backup service should balance historical versus current backup performance information. Otherwise, a default value set by the backup service will be used. A value of zero causes all historical values to be disregarded entirely, while a value of one gives historical data a heavy weight. A value closer to zero would be appropriate when the behavior of the information system is sporadic.

The variable n represents the total number of backup cycles performed by the backup service and is the number assigned to the current cycle.

The variable ER[i] stores the expected runtime for extracting table[i].

The variable Size[i] stores the number of rows retrieve from the previous run of the backup service.

The variable CE[i] stores a current adjusted estimate for a runtime to extract table[i]. It will be used as a value function to sort the tables for extraction by workers, from longest to shortest current estimated runtime.

For the first backup (202) from the information service by the backup service, n=0. For i=1 to T (204), the backup service will extract the table[i], set ER[i] to the actual runtime of the extraction, and set Size[i] to the actual size of the extracted data downloaded, e.g., the number of rows.

For subsequent backups (206), the backup service will (208) increment n by 1 and store n, set alpha to 1/n, and for i=1 to T: get the size of table[i], e.g., from the information service, and set NewSize to this value, set Ratio to NewSize/Size[i], and set CE[i] to Ratio×ER[i]. The values of Size[i] and ER[i] are those from the previous backup cycle where n was n−1.

The backup service then extracts the data. The backup service assigns (210) jobs to workers to extract tables[i] in order of their respective CE[i] values, from largest to smallest expect runtimes. In some implementations, each worker is given a list of jobs at the outset in a round robin fashion. In other implementations, the job scheduler assigns a longest expected unassigned table[i] to a worker when the worker becomes available to take a new job.

The backup service performs (212) the following actions for each of tables to be extracted, e.g., at the end of each table download: (a) set Size[i] to the actual size of the downloaded table[i], e.g., the number of rows of the table, and store the new Size[i], (b) set DT to the actual download time of the table[i], and (c) set ER[i] to ER[i]+alpha×(DT+lambda×ER[i]−ER[i]) and store the new ER[i]. Note that the size of a downloaded table may be different from the NewSize obtained from the information service earlier, because the table may have changed in the interim.

The stored values of ER[i] and Size[i] are used to calculate estimated runtimes for backing up the tables in the next backup cycle, e.g., the next day's backup.

The way ER[i] is calculated enables the expected runtime value calculation to be adaptive according to system behavior over time to reflect the most recent runtime, while still having a damping effect to limit the effect of any sporadic and transient effects of the behavior of the information service, e.g., on a previous day's runtime on a table resulting, for example, from poor performance due to contention with other processes running against the same table.

This method is notable and advantageous in a number of respects. It is memory efficient; it only needs to keep table size and table estimated runtime for each table, and a global number of previous runs n. The leaning rate alpha=1/n provides faster learning at the beginning when fewer backups were completed and moderate learning rate as experience is accumulated. The size ratio is an inexpensive and effective heuristic to scale the expected runtime for use in a way that adapts to changes in the underlying database. The actual runtime experience data is used in a compute-efficient way to update the expected runtime for each table. The use of lambda allows an information system user to control the degree of impact recent runtimes have on a current expected runtime compared to the impact of historical runtimes.

In some implementations, the learning rate alpha can be modified or even defined by a user as a function of n, i.e., the total number of backup cycles performed by the backup service reflected in the calculation. Optionally, the system can receive an input from a user that indicates whether the user wants the learning rate to be aggressive or, on the other hand, wants the learning to be slower to capture subtle details of system behavior. When alpha is small, the expected runtime ER changes slowly over time, whereas when alpha is large, the expect runtime changes more quickly. In alternative implementations, alpha decreases more slowly or more quickly.

Important characteristics of the method include the following. It is profile-guided, i.e., the expected runtime calculation is based on a profiling of the actual run time. It is adaptive, i.e., self-learning: the expected runtime is calculated using a temporal-difference value function that implements tradeoffs between short-term and long-term system behavior so as to filter out the sporadic or erratic system characteristics as identified by a user. It makes effective use of heuristics: the selection of optimal solution exploits scaling the expected runtime value by the empirical size data retrieved from the information system in real time. It is customizable: a user has the ability to control the tradeoff based on their understanding of their system characteristics, e.g., whether it is in a stable network, whether it is in a heavily-used shared environment, or whether it is just a stable system having a bad day. It is a greedy algorithm that results in an optimal, shortest elapsed time to complete a backup.

In some implementations, the initial value of lambda is 0.5 to provide a balanced view. With experience, a user can set it based on the user's understanding of the system, e.g., whether it is a generally stable system with a similar number of users and similar workloads and applications every day, or is sporadic depending, for example, on market activities.

The user can observe, and reach a conclusion based on, other system metrics provided by the information system provider, e.g., a SaaS provider, or the user can infer system characteristics from the daily backups, seeing, for example, in a same entity with almost the same volume of data, what the variance is in the backup time from day to day.

The subject matter and the actions and operations described in this specification can be implemented in digital electronic circuitry, in tangibly-embodied computer software or firmware, in computer hardware, including the structures disclosed in this specification and their structural equivalents, or in combinations of one or more of them. The subject matter and the actions and operations described in this specification can be implemented as or in one or more computer programs, e.g., one or more modules of computer program instructions, encoded on a computer program carrier, for execution by, or to control the operation of, data processing apparatus. The carrier can be a tangible non-transitory computer storage medium. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, the subject matter described in this specification can be implemented on one or more computers having, or configured to communicate with, a display device, e.g., a LCD (liquid crystal display) monitor, or a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech, or tactile feedback or responses; and input from the user can be received in any form, including acoustic, speech, tactile, or eye tracking input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

Although the disclosed inventive concepts include those defined in the attached claims, it should be understood that the inventive concepts can also be defined in accordance with the following embodiments.

In addition to the embodiments of the attached claims and the embodiments described above, the following numbered embodiments are also innovative.

Embodiment 1 is a method comprising:
extracting, by workers of a backup service, entities of a set of entities from an information system, the backing up of the entities being performed in sequential backup cycles;
scheduling jobs in each backup cycle to extract the entities, wherein each job is performed by one of a plurality of workers of a backup service, the jobs being assigned to workers in order of current expected runtimes of the extraction of the entities being extracted, from longest to shortest expected runtime; and
for each entity and for each backup cycle after an initial backup cycle calculating a current expected runtime for the entity from:
a learning factor alpha,
a damping factor lambda,
a download time DT, being a runtime to download the entity in an immediately preceding backup cycle,
a size ratio Ratio, being a ratio of (i) a current size of the entity obtained from the information service to (ii) a size of the entity as downloaded in the immediately preceding backup cycle, and
a previous expected runtime ER, being an expected runtime calculated for the entity for the immediately preceding backup cycle,
the current expected runtime being calculated according to current expected runtime=Ratio×(ER+alpha×(DT+lambda×ER−ER)).

Embodiment 2 is a method comprising:
maintaining, for each of two or more data objects for an entity as part of a data backup process for the two or more data objects, an estimated backup time for the respective data object using a combination of size data for the respective data object and historical backup time data for the respective data object;
selecting, from the two or more data objects and using the estimated backup times, a first data object that has a longest estimated backup time; and
assigning, to a first worker from two or more workers that will each backup at least some data objects from the two or more data objects, the first data object to cause the first worker to back up the first data object from a primary data storage location to a backup data storage location Embodiment 3 is the method of any one of the preceding embodiments, wherein the set of entities includes entities that are tables of a database.

Embodiment 4 is the method of any one of the preceding embodiments wherein alpha is determined for each backup cycle after the initial backup cycle as 1/n, wherein n is a number incremented with each backup cycle; and lambda is a value between zero and one, inclusive.

Embodiment 5 is the method of any one of the preceding embodiments wherein an initial value of alpha is one with n equal to one; and n is incremented by one with each backup cycle.

Embodiment 6 is the method of any one of the preceding embodiments wherein the backup service provides an interface for a user of the information service to set the value of lambda.

Embodiment 7 is the method of any one of the preceding embodiments wherein the information service is cloud-based and the entities are stored on cloud-based storage devices.

Embodiment 8 is the method of any one of the preceding embodiments wherein the workers download the entities over the Internet.

Embodiment 9 is the method of any one of the preceding embodiments wherein the workers store data from the extracted entities on cloud-based storage devices.

Embodiment 10 is a system comprising one or more computers and one or more storage devices storing instructions that are operable, when executed by the one or more computers, to cause the one or more computers to perform the operations of any one of claims 1 to 9.

Embodiment 11 is a computer program carrier encoded with a computer program, the program comprising instructions that are operable, when executed by data processing apparatus, to cause the data processing apparatus to perform the method of any one of embodiments 1 to 9.

Embodiment 12 is the computer program carrier of embodiment 11, wherein the computer program carrier is a non-transitory computer program medium or a propagated signal.

Embodiment 13 is a non-transitory computer storage medium encoded with instructions that are operable, when executed by one or more computers, to cause the one or more computers to perform the method of any one of embodiments 1 to 9.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this by itself should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:
1. A system comprising:
one or more computers and one or more storage devices on which are stored instructions that are operable, when executed by the one or more computers, to cause the one or more computers to perform operations comprising:

extracting, by first workers of a backup service, entities (a) of a set of entities from an information service and (b) for backing up of the entities in sequential backup cycles;

scheduling jobs in each backup cycle to extract the entities, wherein each job is performed by one of a plurality of workers of the backup service, the jobs being assigned to workers from the plurality of workers in order of current expected runtimes of the extraction of the entities being extracted, from longest to shortest expected runtime; and for each entity and for each backup cycle after an initial backup cycle calculating a current expected runtime for the entity from:
- a learning factor alpha,
- a damping factor lambda,
- a download time DT, being a runtime to download the entity in an immediately preceding backup cycle,
- a size ratio Ratio, being a ratio of (i) a current size of the entity obtained from the information service to (ii) a size of the entity as downloaded in the immediately preceding backup cycle, and
- a previous expected runtime ER, being an expected runtime calculated for the entity for the immediately preceding backup cycle, the current expected runtime being calculated according to current expected runtime=Ratio×(ER+alpha×(DT+lambda×ER−ER)).

2. The system of claim 1, wherein:
the set of entities includes entities that are tables of a database.

3. The system of claim 1, wherein:
alpha is determined for each backup cycle after the initial backup cycle as 1/n, wherein n is a number incremented with each backup cycle; and
lambda is a value between zero and one, inclusive.

4. The system of claim 3, wherein:
an initial value of alpha is one with n equal to one and n is incremented by one with each backup cycle.

5. The system of claim 1, wherein:
the backup service provides an interface for a user of the information service to determine a value for lambda.

6. The system of claim 1, wherein a first number of the workers from the plurality of workers is less than a second number of the entities.

7. The system of claim 1, wherein the operations comprise:
determining a degree to which data stored at the information service is sporadic; and
computing lambda using the degree to which the data stored at the information service is sporadic.

8. The system of claim 1, wherein, for each entity and for each backup cycle, after the initial backup cycle, calculating the current expected runtime for the entity uses the lambda that represents a degree to which the current expected runtime for a corresponding entity depends on the previous expected runtime ER.

9. One or more non-transitory computer-readable storage media encoded with instructions that, when executed by one or more computers, cause the one or more computers to perform operations comprising:

extracting, by first workers of a backup service, entities (a) of a set of entities from an information service and (b) for backing up of the entities in sequential backup cycles;

scheduling jobs in each backup cycle to extract the entities, wherein each job is performed by one of a plurality of workers of the backup service, the jobs being assigned to workers from the plurality of workers in order of current expected runtimes of the extraction of the entities being extracted, from longest to shortest expected runtime; and for each entity and for each backup cycle after an initial backup cycle calculating a current expected runtime for the entity from:
- a learning factor alpha,
- a damping factor lambda,
- a download time DT, being a runtime to download the entity in an immediately preceding backup cycle,
- a size ratio Ratio, being a ratio of (i) a current size of the entity obtained from the information service to (ii) a size of the entity as downloaded in the immediately preceding backup cycle, and
- a previous expected runtime ER, being an expected runtime calculated for the entity for the immediately preceding backup cycle, the current expected runtime being calculated according to current expected runtime=Ratio×(ER+alpha×(DT+lambda×ER−ER)).

10. The one or more computer-readable storage media of claim 9, wherein:
the set of entities includes entities that are tables of a database.

11. The one or more computer-readable storage media of claim 9, wherein:
alpha is determined for each backup cycle after the initial backup cycle as 1/n, wherein n is a number incremented with each backup cycle; and
lambda is a value between zero and one, inclusive.

12. The one or more computer-readable storage media of claim 9, wherein:
an initial value of alpha is one with n equal to one and n is incremented by one with each backup cycle.

13. The one or more computer-readable storage media of claim 9, wherein:
the backup service provides an interface for a user of the information service to determine a value for lambda.

14. The one or more computer-readable storage media of claim 6, wherein the operations comprise:
determining a degree to which data stored at the information service is sporadic; and
computing lambda using the degree to which the data stored at the information service is sporadic.

15. A method comprising:
extracting, by first workers of a backup service, entities (a) of a set of entities from an information service and (b) for backing up of the entities in sequential backup cycles;

scheduling jobs in each backup cycle to extract the entities, wherein each job is performed by one of a plurality of workers of the backup service, the jobs being assigned to workers from the plurality of workers in order of current expected runtimes of the extraction of the entities being extracted, from longest to shortest expected runtime; and for each entity and for each backup cycle after an initial backup cycle calculating a current expected runtime for the entity from:

a learning factor alpha, a damping factor lambda, a download time DT, being a runtime to download the entity in an immediately preceding backup cycle, a size ratio Ratio, being a ratio of (i) a current size of the entity obtained from the information service to (ii) a size of the entity as downloaded in the immediately preceding backup cycle, and a previous expected runtime ER, being an expected runtime calculated for the entity for the immediately preceding backup cycle, the current expected runtime being calculated according to current expected runtime=Ratio×(ER+alpha×(DT+lambda×ER−ER)).

16. The method of claim 15, wherein:
the set of entities includes entities that are tables of a database.

17. The method of claim 15, wherein:
alpha is determined for each backup cycle after the initial backup cycle as 1/n, wherein n is a number incremented with each backup cycle; and
lambda is a value between zero and one, inclusive.

18. The method of claim 15, wherein:
an initial value of alpha is one with n equal to one and n is incremented by one with each backup cycle.

19. The method of claim 15, wherein:
the backup service provides an interface for a user of the information service to determine a value for lambda.

20. The method of claim 15, comprising:
determining a degree to which data stored at the information service is sporadic; and
computing lambda using the degree to which the data stored at the information service is sporadic.

* * * * *

UNITED STATES PATENT AND TRADEMARK OFFICE
CERTIFICATE OF CORRECTION

| | | |
|---|---|---|
| PATENT NO. | : 12,147,308 B2 | Page 1 of 1 |
| APPLICATION NO. | : 18/089819 | |
| DATED | : November 19, 2024 | |
| INVENTOR(S) | : Jason K. S. Choy et al. | |

It is certified that error appears in the above-identified patent and that said Letters Patent is hereby corrected as shown below:

In the Claims

Column 9, Line 59, Claim 8, delete "each backup cycle," and insert therefor -- each backup cycle --; and Column 10, Line 51, Claim 14, delete "claim 6" and insert therefor -- claim 9 --.

Signed and Sealed this
Eleventh Day of February, 2025

Coke Morgan Stewart
*Acting Director of the United States Patent and Trademark Office*